(12) United States Patent
Takada et al.

(10) Patent No.: US 6,303,199 B1
(45) Date of Patent: Oct. 16, 2001

(54) COATING AGENT FOR FILM, LAMINATE AND METHOD FOR PRODUCING IT

(75) Inventors: Shigeki Takada; Sadahiko Shiraga, both of Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/324,914

(22) Filed: Jun. 3, 1999

(30) Foreign Application Priority Data

Jun. 3, 1998 (JP) .................................................. 10-154329
Jun. 3, 1998 (JP) .................................................. 10-154330

(51) Int. Cl.$^7$ ..................................................... B25D 22/00
(52) U.S. Cl. ....................... 428/34.8; 428/35.3; 428/35.4; 428/36.7; 428/349; 428/474.4; 428/475.8; 428/476.1; 428/518; 260/29.6; 524/503
(58) Field of Search .................................. 428/36.7, 35.3, 428/35.4, 34.8, 518, 349, 474.4, 475.8, 476.1; 260/29.6; 524/503

(56) References Cited

U.S. PATENT DOCUMENTS

| | | | |
|---|---|---|---|
| 4,544,698 | * 10/1985 | Roullet | 524/503 |
| 4,927,689 | * 5/1990 | Markiewicz | 428/34.8 |
| 5,885,720 | 3/1999 | Fujiwara et al. | 428/511 |

FOREIGN PATENT DOCUMENTS

| | | |
|---|---|---|
| 0 386 720 | 9/1990 | (EP) . |
| 4-331246 | 11/1992 | (JP) . |
| 3-32924 | 2/1994 | (JP) . |
| 8-188624 | 7/1996 | (JP) . |
| 9-241999 | 9/1997 | (JP) . |

OTHER PUBLICATIONS

Chemical Abstracts, vol. 127, No. 20, Nov. 17, 1997, AN 279753, JP 09–2461999, Sep. 16, 1997.

Chemical Abstracts, vol. 125, No. 18, Oct. 28, 1996, AN 224104, JP 08–1888624, Jul. 23, 1996.

* cited by examiner

*Primary Examiner*—Leszek Kiliman
(74) *Attorney, Agent, or Firm*—Oblon, Spivak, McClelland, Maier & Neustadt, P.C.

(57) ABSTRACT

A water-soluble polyvinyl alcohol coating agent for a film contains from 3 to 19 mol % of α-olefin units, wherein each said α-olefin unit contains up to 4 carbon atoms. The polyvinyl alcohol coating agent can be coated on a polyolefin, a polyester or a polyamide substrate film to form a laminate film. A method for producing the laminate film comprises applying an aqueous solution of the coating agent to the substrate film, followed by drying the coating.

15 Claims, No Drawings

COATING AGENT FOR FILM, LAMINATE AND METHOD FOR PRODUCING IT

BACKGROUND OF THE INVENTION

1. Field of the Invention

The present invention relates to a coating agent for a film, a process for coating the coating agent on film, and the laminate film produced thereby. The laminate film can be used as a wrapping film, for example, for wrapping food.

2. Description of the Related Art

Various types of oxygen gas barrier films, and wrapping materials containing oxygen gas barrier films, are known. Aluminum (Al) foil has perfect oxygen gas barrier properties, but when used by itself, it often has pin holes. Therefore, Al foil is used as the interlayer of laminate films. However, since laminate films containing an Al foil layer are not transparent, it is difficult to see the contents of packages made with such films. Furthermore, packages made from films containing an Al foil layer cannot be used in applications in which it is desirable to use metal detectors to identify metal contamination of the contents. Finally, films containing an Al foil layer generate Al residues after incineration.

Other known oxygen gas barrier films are polyvinylidene chloride (PVDC) films and PVDC-coated films. PVDC absorbs little moisture and exhibits good gas barrier properties even in high-humidity conditions, and is therefore used for coating various substrates. The substrates to be coated with PVDC include films of, for example, biaxially-oriented polypropylene (OPP), biaxially-oriented nylon (ON), biaxially-oriented polyethylene terephthalate (OPET), and cellophane, etc. However, PVDC-laminated films are problematic in that they generate hydrogen chloride gas when incinerated as waste.

Completely hydrolyzed, non-modified polyvinyl alcohol (PVA) films are also known as oxygen gas barrier films. PVA films exhibit excellent oxygen gas barrier properties under low-humidity conditions. In general, however, they absorb moisture, and their oxygen gas barrier properties are greatly degraded in high-humidity conditions in which the relative humidity is around 70% or higher. Another problem with PVA films is that their adhesion to OPP or OPET substrate films is poor. Some proposals have been made heretofore for attenuating the moisture absorption of PVA. For example, an ethylene-vinyl alcohol copolymer (EVOH) having an ethylene comonomer content of at least 20 mol % can be used, or both surfaces of PVA films can be coated with PDVC. However, EVOH coating solutions must contain organic solvents, and the organic solvents used are detrimental to the working environment. Alternatively, PVDC-coated films are also problematic in that they generate hydrogen chloride gas when incinerated.

The following techniques are known, relating to the present invention.

(1) JP-A 4-331246 discloses gas barrier materials prepared by coating moisture-proof plastics (e.g., polyethylene, polypropylene) with a gas barrier substance capable of dissolving in water or solvents (e.g., polyvinyl alcohols having a degree of hydrolysis of at least 95 mol %, ethylene-vinyl alcohol copolymer having an ethylene content of from 28 to 51 mol %).

(2) JP-A 6-32924 discloses oxygen barrier films prepared by coating biaxially-oriented polypropylene films or biaxially-oriented polyester films with an aqueous solution of a polyvinyl alcohol having a degree of polymerization of from 300 to 1000 and a degree of hydrolysis of from 95 to 99.5 mol %, thereby forming thereon a coating layer having a thickness of from 1.7 to 4 $\mu$m.

(3) U.S. Pat. No. 4,927,689 discloses gas barrier structures prepared by coating a thermoplastic resin substrate with a first coating layer of a urethane primer of from 0.3 to 3.0 g/m$^2$ and a second coating layer of a polyvinyl alcohol of at most about 2.0 g/m$^2$.

(4) The present applicant's own JP-A 8-188624 discloses self-sustaining films (preferred thickness: from 10 to 100 $\mu$m) of a modified polyvinyl alcohol that contains from 1 to 20 mol % of $\alpha$-olefin units with up to 4 carbon atoms and has a degree of polymerization of at least 700.

(5) The present applicant's own JP-A 9-241999 discloses a coating agent for paper that comprises a modified polyvinyl alcohol containing from 3 to 15 mol % of ethylene units.

SUMMARY OF THE INVENTION

We have found that a water-soluble polyvinyl alcohol containing from 3 to 19 mol % of $\alpha$-olefin units, each $\alpha$-olefin unit containing up to 4 carbon atoms can be coated onto a film, forming a laminate having excellent oxygen gas barrier properties. Specifically, laminates comprising a layer of a water-soluble polyvinyl alcohol that contains from 3 to 19 mol % of $\alpha$-olefin units, each $\alpha$-olefin unit containing up to 4 carbon atoms, and a layer of a polyolefin, a polyester or a polyamide, have excellent oxygen gas barrier properties.

We have also found a method for producing the laminate, which comprises applying an substantially aqueous solution of a water-soluble polyvinyl alcohol that contains from 3 to 19 mol % of $\alpha$-olefin units, each $\alpha$-olefin unit containing up to 4 carbon atoms, to the surface of a polyolefin, a polyester or a polyamide film, wherein the solution contains at most 50% by weight of a lower aliphatic alcohol. Further, the coated film can be dried at a drying speed that falls between 2 and 2000 g/m$^2$·min.

DETAILED DESCRIPTION OF THE PREFERRED EMBODIMENTS

The polyvinyl alcohol (PVA) used in the invention is a water-soluble PVA containing from 3 to 19 mol % of $\alpha$-olefin units, each $\alpha$-olefin unit containing up to 4 carbon atoms.

By water-soluble PVA, we mean that the PVA dissolves in an aqueous solution containing at most 50% by weight of a lower aliphatic alcohol. Ethylene and propylene are the preferred $\alpha$-olefins units.

The content of $\alpha$-olefin units in the water-soluble PVA can be 3, 4, 5, 6, 7, 8, 9, 10, 11, 12, 13, 14, 15, 16, 17, 18, or 19 mol %, inclusive of all values and subranges therebetween. Preferably, the $\alpha$-olefin content of the water-soluble PVA is between 5 and 16 mol %, more preferably between 7 and 14 mol %. If the $\alpha$-olefin content is smaller than 3 mol %, PVA films may not exhibit good barrier properties in high-humidity conditions. If the $\alpha$-olefin content is more than 19 mol %, the water solubility of PVA is too low, making it difficult to coat the PVA from aqueous solution.

The degree of hydrolysis of the water-soluble PVA of this invention may be 90, 91, 92, 93, 94, 95, 96, 97, 98, 99, or 99.99 mol %, inclusive of all values and subranges therebetween. Preferably the degree of hydrolysis falls between 90 and 99.99 mol %, more preferably between 97 and 99.95 mol %, even more preferably between 99 and 99.90 mol %. PVA having a degree of hydrolysis of larger than 99.99 mol % is difficult to produce on an industrial scale. Furthermore, a thin solid film tends to form on the top of aqueous solutions of PVA in which the degree of hydrolysis is greater than 99.99 mol %. Films formed from PVA having a degree of hydrolysis less than 90 mol % do not exhibit satisfactory oxygen gas barrier properties.

The degree of polymerization of the PVA may be 100, 200, 300, 400, 500, 600, 700, 800, 900, 1000, 1100, 1200, 1300, 1400, 1500, 1600, 1700, 1800, 1900, or 2000, inclusive of all values and subranges therebetween. The degree of polymerization is preferably up to 2000, more preferably up to 1000, even more preferably up to 600, still more preferably between 100 and 400. The viscosity of aqueous solutions of PVA having a degree of polymerization of higher than 2000 is too high, giving the solution poor coating properties. If the degree of polymerization is lower than 100, the strength of the resulting PVA coating is low and pin holes are often formed. The degree of polymerization of PVA is measured according to JIS K6726.

The PVA may further contain 0.1, 1, 2, 3, 4, or 5 mol %, inclusive of all values and subranges therebetween, of silyl group-containing units. Preferably, the PVA contains up to 5 mol %, more preferably up to 3 mol %, even more preferably between 0.1 mol % and 1.5 mol % silyl group-containing units. If the silyl group-containing unit content is larger than 5 mol %, the stability of the aqueous PVA solution will be extremely low. The PVA may be prepared by any known method.

The sodium acetate content of the PVA may be 0.01, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0% by weight, inclusive of ali values and subranges therebetween. It is desirable that the sodium acetate content ranges from 0.01 to 2% by weight. The sodium acetate content of PVA preferably falls between 0.02 and 1% by weight, more preferably between 0.03 and 0.5% by weight, even more preferably between 0.03 and 0.45% by weight. If the sodium acetate content falls outside the range falling between 0.01 and 2% by weight, PVA films have poor oxygen gas barrier properties.

The oxygen transmission rate of PVA coating agent films of the present invention may be measured using the following method. A film of the PVA coating agent is heated in air (preferably at a temperature falling between 140 and 240° C., more preferably between 160 and 200° C., and at 180° C. in a model test, for a period of time falling between 10 and 300 seconds, more preferably between 30 and 180 seconds, and for 120 seconds in the model test), and then conditioned at 20° C. and at 85% RH. The oxygen transmission rate of the PVA film, thus treated, is then measured. The oxygen transmission rate of the PVA coating agent film is obtained by converting the measured value into a value for the film of the PVA coating agent having a presumptive thickness of 20 $\mu$m.

For laminates comprising a layer of the PVA coating agent, the oxygen transmission rate of the laminate is measured in a manner similar to that described above. The laminates exhibit their gas barrier properties after having been subjected to heat treatment. Therefore, the laminates do not require any additional heat treatment before measuring their oxygen transmission rate. Since the oxygen gas barrier properties of the substrate layer are much lower than those of the PVA coating agent layer, the oxygen gas barrier properties of the laminates depend substantially on the oxygen gas barrier properties of the PVA layer alone. Accordingly, even for the laminates, it is possible to convert the oxygen transmission rate of the laminate to a value for a laminate having a PVA coating agent layer with a presumptive thickness of 20 $\mu$m. Unless otherwise specifically indicated, the oxygen transmission rate refer to the value calculated for a laminate having a PVA coating agent layer with a presumptive thickness of 20 $\mu$m.

The oxygen transmission rate of films and laminates containing a PVA coating agent layer may be 0.1, 0.5, 1, 2, 3, 4, 5, 6, 7, 8, 9, 10, 11, 12, 13, 14, or 15 cc/m$^2$·day·atm, inclusive of all values and subranges therebetween. It is desirable that the laminates have an oxygen transmission rate, as measured and defined according to the method described above, of from 0.1 to 15 cc/m$^2$·day·atm, more preferably from 0.1 to 10 cc/m$^2$·day·atm, even more preferably 0.1 to 5 cc/m$^2$·day·atm.

The oxygen gas barrier properties of films and laminates of the PVA coating agent are significantly improved when the $\alpha$-olefin unit content, the degree of hydrolysis and the sodium acetate content of the PVA coating agent fall within the preferred ranges.

The substrate films to be coated with the coating agent for film of the invention include, for example, polyolefin films, polyester films, polyamide films, etc. It is desirable to incorporate silicon (Si) into the substrate film of polyolefin films, polyester films, polyamide films, etc. The silicon content of the substrate film may be 0.1, 0.5, 1.0, 1.5, or 2.0% by weight, inclusive of all values and subranges therebetween. The silicon content of the substrate film is preferably up to 2% by weight, more preferably up to 1% by weight, even more preferably between 0.1 and 0.5% by weight. Polyolefin films, polyester films and polyamide films that contain silicon in an amount of from 0.1 to 2% by weight have increased adhesion to the PVA coating agent. Silicon is generally added to the substrate film in the form of a silica compound. Any known silica compounds, such as silicon oxide, alkyl silicates, etc. may be employed for this purpose. Colloidal silica (SiO$_2$) is a preferred silica compound. Generally, silica compounds are added to the substrate film by mixing the silica compound with a resin, to prepare a composition containing the silica compound that can be formed into a film.

The final thickness of the oriented substrate film be 5, 10, 15, 20, 25, 30, 35, 40, 45, 50, 55, 60, 65, 70, 75, 80, 85, 90, 95, or 100 $\mu$m, inclusive of all values and subranges therebetween. Preferably, the final thickness falls between 5 and 100 $\mu$m.

The laminate of the invention is characterized by comprising (A), a layer of a water-soluble PVA that contains from 3 to 19 mol % of $\alpha$-olefin units, each $\alpha$-olefin unit containing up to 4 carbon atoms, and (B), a layer of a polyolefin, a polyester or a polyamide. Preferably, the layer (A) has a surface smoothness, measured according to the method described below, of not more than 50 $\mu$m/cm in terms of the sum total of the height of micro convexities existing in the surface of the layer (A).

Method for Measuring Surface Smoothness:

A substrate film is coated with PVA and dried to prepare a laminate. Next, the surface smoothness of the PVA layer (A) is measured with a universal surface profile meter, SE-3C Model from Kosaka Laboratories, to prepare a surface profile chart. From the chart, the sum total, per cm, of the height of micro convexities in the surface of the layer (A) is derived, thus indicating the surface smoothness of layer (A).

The laminate may be made by coating a substrate film with the PVA coating agent, alone. For the purpose of making the resulting film water resistant, the coating agent may preferably combined with a crosslinking agent. The crosslinking agent may include, for example, epoxies, isocyanates, aldehydes, silica compounds, aluminum compounds, zirconium compounds, boron compounds, etc. Silica compounds such as colloidal silica, and alkyl silicates, etc., are preferred. Generally, the amount of crosslinking agent added may be be 5, 10, 15, 20, 25, 30, 35, 40, 45, 50, 55, or 60 parts per 100 parts PVA, inclusive of all values and subranges therebetween. Preferably, the amount of crosslinking agent is 5 to 60 parts by weight relative to 100 parts by weight of PVA, more preferably from 10 to 40 parts by weight, and even more preferably from 15 to 30 parts by weight. If the amount of crosslinking agent is larger than 60 parts by weight, the added crosslinking agent will degrade the gas barrier properties of the laminate.

The PVA coating agent is generally applied to the substrate in the form of an aqueous solution. The PVA concentration in the aqueous solution is not specifically defined, but may be 5, 10, 15, 20, 25, 30, 35, 40, 45, or 50% by weight, inclusive of all values and subranges therebetween. The PVA concentration is preferably from 5 to 50% by weight. If the PVA concentration is less than 5% by weight, the heat load for drying the coated film will be large; and if the concentration of PVA is larger than 50% by weight, the viscosity of the aqueous solution will be too high, thus degra(ling the coatability of the solution.

The aqueous solution of the PVA coating agent for film may optionally contain a surfactant, and/or a leveling agent, etc. It may further contain a lower aliphatic alcohol, such as methanol, ethanol, isopropyl alcohol or the like, in an amount of up to 50% by weight or so. Adding such a lower aliphatic alcohol can improve the coatability of the solution. Further, the aqueous solution of the PVA coating agent may additionally contain a fungicide agent, and/or a preservative, etc.

The temperature at which an aqueous solution of the coating agent for film may be applied to a substrate film preferably falls between 20 and 80° C. Preferably, a gravure-roll coating method, a reverse-gravure coating method, a reverse-roll coating method, or a mayer-bar coating method are employed as a coating method.

The substrate film may be previously oriented or heat-treated and then coated with the aqueous solution of the coating agent, or, alternatively, the substrate film may be oriented or heat-treated after coating with the coating agent solution. A multi-stage coating method that comprises a step of first-stage orientation of a substrate film, a step of coating the thus-oriented substrate film with an aqueous solution of the coating agent and a step of second-stage orientation of the coated film, in which the film is heat-treated during or after the second-stage orientation step is preferred.

The final thickness of the layer of the coating agent layer formed on the substrate film after orientation of the coated film may be 0.1, 1, 2, 3, 4, 5, 6, 7, 8, 9, 10, 11, 12, 13, 14, 15, 16, 17, 18, 19, or 20 $\mu$m, inclusive of all values and subranges therebetween, preferably between 0.1 and 20 $\mu$m, more preferably between 0.1 and 9 $\mu$m.

The drying conditions employed after applying the aqueous solution of the PVA coating agent to the substrate film is an important step of the method for producing the laminate. Preferably, after applying the PVA coating agent to the substrate surface, the resulting laminate is dried at a drying speed of from 2 to 2000 g/m$^2$·min. The drying speed may be 2, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, or 2000 g/m$^2$·min, inclusive of all values and subranges therebetween. More preferably, the drying speed falls between 50 and 500 g/m$^2$·min.

An adhesive layer may be disposed between the PVA coating agent layer and the substrate layer, in order to improve the adhesion therebetween. The adhesive component may be applied to the surface of the substrate film before the substrate film is coated with the PVA coating agent, or, alternatively, it may be mixed in the aqueous solution of the PVA coating agent before the coating agent is applied to the substrate film.

The gas barrier laminate film generally has a heat seal resin layer formed on the PVA film layer. Generally, the heat seal layer is formed by extrusion lamination or dry lamination. Polyethylene resins such as HDPE, LDPE, LLDPE, etc., as well as PP resins, ethylene-vinyl acetate copolymers, ethylene-α-olefin random copolymers, ionomer resins, etc., can be employed as heat seal resins.

In general, the PVA coating agent is applied to a substrate film and then heated in air, or the like, at a temperature suitable for oriented polyolefin films, polyester films, polyamide films. The temperature for the heat treatment may fall between 140° C. and 170° C. for polyolefin films, and between 140° C. and 240° C. for polyester films and polyamide films. In general, the heat treatment of the PVA coating agent layer may be carried out simultaneously with that of the substrate film.

It is desirable to vary the temperature for heat treatment in accordance with the melting point, Tm (° C.), of PVA obtained by DSC. Preferably, the heat treatment temperature, T (° C.), falls within the range that satisfies the following formula (1), more preferably within the range that satisfies the following formula (2).

$$Tm-70 \leq T \leq Tm \tag{1}$$

$$Tm-50 \leq T \leq Tm-20 \tag{2}$$

The laminate of the invention exhibits excellent gas barrier properties, covering a broad humidity range of from low humidity to high humidity, and, in addition, its appearance is good and its ability to be formed into bags in high-speed production lines is also good.

Further, the laminate of the invention is suitable for wrapping film applications, such as food wrapping films, etc., because it has excellent oxygen gas barrier properties. In addition, the laminate has the advantage of not generating harmful hydrogen chloride gas when incinerated.

Having generally described this invention, a further understanding can be obtained by reference to certain specific examples which are provided herein for purposes of illustration only and are not intended to be limiting unless otherwise specified.

EXAMPLES

The invention is described with reference to the following Examples and Comparative Examples, which, however, are not intended to restrict the scope of the invention.

In the following Examples and Comparative Examples, "part" and "%" are by weight, unless otherwise specifically indicated. To measure their oxygen transmission rate (OTR, cc/m$^2$·day·atm), the PVA-coated films (laminates composed of a substrate and PVA) were previously conditioned at a temperature of 20° C. and at a relative humidity of 85% for 5 days, and then tested. The oxygen transmission rate shown in the following Table indicates the converted calculated value for the film of the PVA coating agent having a presumptive thickness of 20 $\mu$m.

Examples 1 to 20, Comparative Example 1

Polyvinyl alcohol (hereinafter referred to as PVA) shown in Table 1 was gradually added to water containing 7% (but 0% in Examples 2, 3, 18, 19 and 20% in Examples 4, 5, 6, 7, 17) of isopropyl alcohol, with stirring, and uniformly dispersed therein. Then, the resulting dispersion was heated at about 95° C. to completely dissolve PVA therein. This was filtered and then cooled to prepare an aqueous PVA solution having a PVA concentration of 20% (but 5% in Examples 16 and 17).

Using a gravure coater, the PVA solution prepared above was applied to the surface of a substrate film having a thickness of 15 μm, as shown in Table 2, at 50° C., then dried at 120° C., and thereafter subjected to heat treatment in air at a temperature shown in Table 2 for 120 seconds. The thickness of the PVA layer thus formed on the substrate film was 2.0 μm. The oxygen transmission rate of the PVA-coated film (laminate composed of the substrate film and the PVA layer) is shown in Table 2.

Comparative Example 2

A laminate was produced in the same manner as in Example 1, except that a PVA film as prepared by casting an aqueous PVA solution was dry-laminated, using an isocyanate-based adhesive, on a substrate film having a thickness of 15 μm and shown in Table 2. The thickness of the PVA layer formed herein was 2.0 μm. The oxygen transmission rate of the laminate is shown in Table 2.

TABLE 1

| | PVA | | | | | | | | |
|---|---|---|---|---|---|---|---|---|---|
| | α-olefin | | Other Modifying Group | | Degree of | Degree of | Sodium Acetate | Crosslinking Agent | |
| | Type | Degree of Modification (mol %) | Type | Degree of Modification (mol %) | Polymerization | Hydrolysis (mol %) | Content (%) | Type | Amount Added (parts/PVA 100 parts) |
| Example 1 | ethylene | 3.5 | — | 0 | 600 | 98 | 0.4 | — | 0 |
| Example 2 | ethylene | 6 | — | 0 | 400 | 98 | 0.4 | — | 0 |
| Example 3 | ethylene | 7.2 | — | 0 | 350 | 98 | 0.4 | — | 0 |
| Example 4 | ethylene | 12 | — | 0 | 350 | 98 | 0.4 | — | 0 |
| Example 5 | ethylene | 13.8 | — | 0 | 350 | 98 | 0.4 | — | 0 |
| Example 6 | ethylene | 15.3 | — | 0 | 350 | 98 | 0.4 | — | 0 |
| Example 7 | ethylene | 17.2 | — | 0 | 350 | 98 | 0.4 | — | 0 |
| Example 8 | ethylene | 10.3 | — | 0 | 350 | 99.5 | 0.8 | — | 0 |
| Example 9 | ethylene | 10.3 | — | 0 | 350 | 99.5 | 0.45 | — | 0 |
| Example 10 | ethylene | 10.3 | — | 0 | 350 | 99.5 | 0.23 | — | 0 |
| Example 11 | ethylene | 10.3 | — | 0 | 350 | 99.5 | 0.18 | — | 0 |
| Example 12 | ethylene | 11.4 | — | 0 | 350 | 99.9 | 0.13 | — | 0 |
| Example 13 | ethylene | 11.4 | — | 0 | 350 | 99.9 | 0.12 | — | 0 |
| Example 14 | ethylene | 11.4 | — | 0 | 350 | 99.9 | 0.14 | — | 0 |
| Example 15 | ethylene | 5.2 | — | 0 | 1500 | 98.8 | 0.2 | — | 0 |
| Example 16 | ethylene | 7.9 | — | 0 | 800 | 98.7 | 0.21 | — | 0 |
| Example 17 | ethylene | 13.5 | — | 0 | 300 | 99.2 | 0.18 | — | 0 |
| Example 18 | ethylene | 8.3 | — | 0 | 500 | 99.8 | 0.13 | — | 0 |
| Example 19 | ethylene | 6 | — | 0 | 450 | 99 | 0.15 | — | 0 |
| Example 20 | etbylene | 3.5 | — | 0 | 500 | 98 | 2.2 | — | 0 |
| Comp. Ex. 1 | ethylene | 2.5 | — | 0 | 500 | 98 | 0.8 | — | 0 |
| Comp. Ex. 2 | ethylene | 10.2 | — | 0 | 500 | 98 | 0.5 | — | 0 |

TABLE 2

| | Substrate Film | | | Laminate | | |
|---|---|---|---|---|---|---|
| | Type | Amount of Colloidal Silica Added (%) | Anchor Coating Agent | Temperature for Heat Treatment (° C.) | Method for Lamination | Oxygen Transmission Rate (cc/m$^{-\text{day-atm}}$) |
| Example 1 | OPP | 0.4 | yes | 160 | aqueous solution coating | 5.1 |
| Example 2 | OPP | 0.4 | yes | 160 | aqueous solution coating | 4.8 |
| Example 3 | OPP | 0.4 | yes | 160 | aqueous solution coating | 3.2 |
| Example 4 | OPP | 0.4 | yes | 160 | aqueous solution coating | 3.2 |
| Example 5 | OPP | 0.4 | yes | 160 | aqueous solution coating | 3 |
| Example 6 | OPP | 0.4 | yes | 160 | aqueous solution coating | 3.8 |
| Example 7 | OPP | 0.4 | yes | 160 | aqueous solution coating | 4.5 |
| Example 8 | OPP | 0.4 | yes | 160 | aqueous solution coating | 3.8 |
| Example 9 | OPP | 0.4 | yes | 160 | aqueous solution coating | 3.1 |
| Example 10 | OPP | 0.4 | yes | 160 | aqueous solution coating | 1.8 |
| Example 11 | OPP | 0.4 | yes | 160 | aqueous solution coating | 1.7 |
| Example 12 | OPP | 0.4 | yes | 160 | aqueous solution coating | 1.6 |
| Example 13 | OPP | 0.4 | yes | 160 | aqueous solution coating | 1.4 |
| Example 14 | OPP | 0.4 | yes | 160 | aqueous solution coating | 1 |
| Example 15 | OPP | 0.4 | yes | 160 | aqueous solution coating | 4.3 |
| Example 16 | OPP | 0.4 | yes | 160 | aqueous solution coating | 4 |
| Example 17 | OPP | 0.4 | yes | 160 | aqueous solution coating | 3.8 |

TABLE 2-continued

| | Substrate Film | | Laminate | | | |
|---|---|---|---|---|---|---|
| | Type | Amount of Colloidal Silica Added (%) | Anchor Coating Agent | Temperature for Heat Treatment (° C.) | Method for Lamination | Oxygen Transmission Rate (cc/m²·day·atm) |
| Example 18 | ON | 0.8 | no | 180 | aqueous solution coating | 2.6 |
| Example 19 | ON | 0.6 | no | 180 | aqueous solution coating | 1.5 |
| Example 20 | OPP | 0 | yes | 160 | aqueous solution coating | 8.9 |
| Comp. Ex. 1 | OPP | 0 | yes | 160 | aqueous solution coating | 20.6 |
| Comp. Ex. 2 | OPP | 0 | yes | 160 | dry lamination | 18.3 |

OPP: Biaxially-oriented polypropylene film
ON: Biaxially-oriented nylon film

Examples 21 to 27, Comparative Examples 3 and 4

Laminates were produced in the same manner as in Example 1, except that a crosslinking agent shown in Table 3 was added to the PVA layer. The thickness of the PVA layer formed was 3.0 μm. The oxygen transmission rate of each laminate is shown in Table 4.

TABLE 3

| | PVA | | | | | | | |
|---|---|---|---|---|---|---|---|---|
| | α-olefin | | Other Modifying Group | | | | Crosslinking Agent | |
| | Type | Degree of Modification (mol %) | Type | Degree of Modification (mol %) | Degree of Polymerization | Degree of Hydrolysis (mol %) | Sodium Acetate Content (%) | Type | Amount Added (parts/PVA 100 parts) |
| Example 21 | ethylene | 10 | — | 0 | 350 | 99.2 | 0.3 | glyoxal | 15 |
| Example 22 | ethylene | 8 | silyl group | 0.2 | 350 | 99.0 | 0.3 | colloidal silica | 5 |
| Example 23 | ethylene | 8 | silyl group | 0.2 | 350 | 99.0 | 0.3 | colloidal silica | 10 |
| Example 24 | ethylene | 8 | silyl group | 0.2 | 350 | 99.0 | 0.3 | colloidal silica | 20 |
| Example 25 | ethylene | 8 | silyl group | 0.2 | 350 | 99.0 | 0.3 | colloidal silica | 30 |
| Example 26 | ethylene | 8 | silyl group | 0.2 | 350 | 99.0 | 0.3 | colloidal silica | 40 |
| Example 27 | ethylene | 8 | silyl group | 0.2 | 350 | 99.0 | 0.3 | colloidal silica | 55 |
| Comp. Ex. 3 | — | 0 | — | 0 | 400 | 99.8 | 0.4 | glyoxal | 15 |
| Comp. Ex. 4 | — | 0 | silyl group | 0.2 | 400 | 99.1 | 0.3 | colloidal silica | 25 |

TABLE 4

| | Substrate Film | | Laminate | | | |
|---|---|---|---|---|---|---|
| | Type | Amount of Colloidal Silica Added (%) | Anchor Coating Agent | Temperature for Heat Treatment (° C.) | Method for Lamination | Oxygen Transmission Rate (cc/m²·day·atm) |
| Example 21 | OPP | 0 | yes | 140 | aqueous solution coating | 4.8 |
| Example 22 | OPP | 0 | yes | 140 | aqueous solution coating | 4.9 |
| Example 23 | OPP | 0 | yes | 140 | aqueous solution coating | 4 |
| Example 24 | OPP | 0 | yes | 140 | aqueous solution coating | 3.3 |
| Example 25 | OPP | 0 | yes | 140 | aqueous solution coating | 3.2 |
| Example 26 | OPP | 0 | yes | 140 | aqueous solution coating | 4.3 |
| Example 27 | OPP | 0 | yes | 140 | aqueous solution coating | 5.3 |
| Comp. Ex. 3 | OPP | 0 | yes | 140 | aqueous solution coating | 20.4 |
| Comp. Ex. 4 | OPP | 0 | yes | 140 | aqueous solution coating | 16.8 |

Examples 28 to 47

An aqueous solution of PVA shown in Table 5 was prepared in the same manner as in Example 1 except that the water containing 20% by weight of isopropyl alcohol was used in Examples 31, 32, 36, 37, 41, 42, 46, 47 instead of the water containing 7% by weight of isopropyl alcohol. Next, at 50° C., the aqueous PVA solution was applied to a substrate film of OPET having a thickness of 15 μm, using a gravure coater, then dried at 120° C., and thereafter subjected to heat treatment in air at a temperature shown in Table 6 for 120 seconds. The thickness of the PVA layer thus formed on the substrate film was 1.2 μm. The oxygen transmission rate of the PVA-coated film is shown in Table 6.

TABLE 5

| | PVA | | | | | | | Crosslinking Agent | |
|---|---|---|---|---|---|---|---|---|---|
| | α-olefin | | Other Modifying Group | | | | | | |
| | Type | Degree of Modification (mol %) | Type | Degree of Modification (mol %) | Degree of Polymerization | Degree of Hydrolysis (mol %) | Sodium Acetate Content (%) | Type | Amount Added (parts/PVA 100 parts) |
| Example 28 | ethylene | 5 | — | 0 | 350 | 99.2 | 0.3 | — | 0 |
| Example 29 | ethylene | 7 | — | 0 | 350 | 99.2 | 0.3 | — | 0 |
| Example 30 | ethylene | 10 | — | 0 | 350 | 99.2 | 0.3 | — | 0 |
| Example 31 | ethylene | 13 | — | 0 | 350 | 99.2 | 0.3 | — | 0 |
| Example 32 | ethylene | 17 | — | 0 | 350 | 99.2 | 0.3 | — | 0 |
| Example 33 | ethylene | 5 | — | 0 | 350 | 99.2 | 0.3 | — | 0 |
| Example 34 | ethylene | 7 | — | 0 | 350 | 99.2 | 0.3 | — | 0 |
| Example 35 | ethylene | 10 | — | 0 | 350 | 99.2 | 0.3 | — | 0 |
| Example 36 | ethylene | 13 | — | 0 | 350 | 99.2 | 0.3 | — | 0 |
| Example 37 | ethylene | 17 | — | 0 | 350 | 99.2 | 0.3 | — | 0 |
| Example 38 | ethylene | 5 | — | 0 | 350 | 99.2 | 0.3 | — | 0 |
| Example 39 | ethylene | 7 | — | 0 | 350 | 99.2 | 0.3 | — | 0 |
| Example 40 | ethylene | 10 | — | 0 | 350 | 99.2 | 0.3 | — | 0 |
| Example 41 | ethylene | 13 | — | 0 | 350 | 99.2 | 0.3 | — | 0 |
| Example 42 | ethylene | 17 | — | 0 | 350 | 99.2 | 0.3 | — | 0 |
| Example 43 | ethylene | 5 | — | 0 | 350 | 99.2 | 0.3 | — | 0 |
| Example 44 | ethylene | 7 | — | 0 | 350 | 99.2 | 0.3 | — | 0 |
| Example 45 | ethylene | 10 | — | 0 | 350 | 99.2 | 0.3 | — | 0 |
| Example 46 | ethylene | 13 | — | 0 | 350 | 99.2 | 0.3 | — | 0 |
| Example 47 | ethylene | 17 | — | 0 | 350 | 99.2 | 0.3 | — | 0 |

TABLE 6

| | Laminate | | | | | |
|---|---|---|---|---|---|---|
| | Substrate Film | | | Temperature for | | |
| | Type | Amount of Colloidal Silica Added (%) | Anchor Coating Agent | Heat Treatment (° C.) | Method for Lamination | Oxygen Transmission Rate (cc/m²·day·atm) |
| Example 28 | OPET | 0 | yes | 140 | aqueous solution coating | 7.2 |
| Example 29 | OPET | 0 | yes | 140 | aqueous solution coating | 6.7 |
| Example 30 | OPET | 0 | yes | 140 | aqueous solution coating | 6.3 |
| Example 31 | OPET | 0 | yes | 140 | aqueous solution coating | 6.0 |
| Example 32 | OPET | 0 | yes | 140 | aqueous solution coating | 5.9 |
| Example 33 | OPET | 0 | yes | 180 | aqueous solution coating | 3.0 |
| Example 34 | OPET | 0 | yes | 180 | aqueous solution coating | 2.9 |
| Example 35 | OPET | 0 | yes | 180 | aqueous solution coating | 2.7 |
| Example 36 | OPET | 0 | yes | 180 | aqueous solution coating | 2.7 |
| Example 37 | OPET | 0 | yes | 180 | aqueous solution coating | 2.9 |
| Example 38 | OPET | 0 | yes | 200 | aqueous solution coating | 1.2 |
| Example 39 | OPET | 0 | yes | 200 | aqueous solution coating | 1.1 |
| Example 40 | OPET | 0 | yes | 200 | aqueous solution coating | 1.2 |
| Example 41 | OPET | 0 | yes | 200 | aqueous solution coating | 2.8 |
| Example 42 | OPET | 0 | yes | 200 | aqueous solution coating | 3 |
| Example 43 | OPET | 0 | yes | 230 | aqueous solution coating | 0.8 |
| Example 44 | OPET | 0 | yes | 230 | aqueous solution coating | 1.1 |
| Example 45 | OPET | 0 | yes | 230 | aqueous solution coating | 1.2 |
| Example 46 | OPET | 0 | yes | 230 | aqueous solution coating | 2.8 |
| Example 47 | OPET | 0 | yes | 230 | aqueous solution coating | 3.2 |

OPET: Biaxially-oriented polyethylene terephthalate film

Examples 48 to 51

An aqueous solution of PVA shown in Table 7 was prepared in the same manner as in Example 1. Next, at 50° C., the aqueous PVA solution was applied to a substrate film of OPET having a thickness of 15 μm, using a gravure coater, then dried at 120° C., and thereafter subjected to heat treatment in air at a temperature shown in Table 8 for 120 seconds. The thickness of the layer thus formed on the substrate film was 1.5 μm. The oxygen transmission rate of the PVA-coated film is shown in Table 8.

TABLE 7

| | PVA | | | | | | | | |
|---|---|---|---|---|---|---|---|---|---|
| | α-olefin | | Other Modifying Group | | | | Sodium Acetate | Crosslinking Agent | |
| | Type | Degree of Modification (mol %) | Type | Degree of Modification (mol %) | Degree of Polymerization | Degree of Hydrolysis (mol %) | Content (%) | Type | Amount Added (parts/PVA 100 parts) |
| Example 48 | ethylene | 10 | — | 0 | 350 | 98.5 | 1.5 | — | 0 |
| Example 49 | ethylene | 10 | — | 0 | 350 | 99.2 | 0.6 | — | 0 |
| Example 50 | ethylene | 10 | — | 0 | 350 | 99.6 | 0.12 | — | 0 |
| Example 51 | ethylene | 10 | — | 0 | 350 | 99.98 | 0.02 | — | 0 |

TABLE 8

| | Substrate Film | | Laminate | | | |
|---|---|---|---|---|---|---|
| | Type | Amount of Colloidal Silica Added (%) | Anchor Coating Agent | Temperature for Heat Treatment (° C.) | Method for Lamination | Oxygen Transmission Rate (cc/m²·day·atm) |
| Example 48 | OPET | 0 | yes | 180 | aqueous solution coating | 7.8 |
| Example 49 | OPET | 0 | yes | 180 | aqueous solution coating | 3.2 |
| Example 50 | OPET | 0 | yes | 180 | aqueous solution coating | 1.5 |
| Example 51 | OPET | 0 | yes | 180 | aqueous solution coating | 0.4 |

Example 52

A modified PVA having an ethylene unit content of 8 mol %, a degree of hydrolysis of 98.8 mol % and a degree of polymerization of 550 was added to water, and uniformly dispersed therein. Then, the resulting dispersion was heated at about 95° C. to completely dissolve the PVA therein. This was filtered and then cooled to prepare an aqueous PVA solution having a PVA concentration of 20%.

Using a gravure coater, the PVA solution prepared above was applied to a substrate film of OPP having a thickness of 15 μm, at 50° C., then dried at 100° C. In the drying step, the drying speed was 100 g/m²·min.

The oxygen transmission rate of the laminate film was measured.

Next, the surface smoothness of the laminate film was measured, using a universal surface profile meter, SE-3C Model from Kosaka Laboratories. The sum total, per cm, of the height of micro convexities in the surface of the laminate film was derived from the data measured, and this indicates the surface smoothness of the laminate film.

On the other hand, an adhesive for dry lamination was applied on the PVA-coated surface of the laminate film to form thereon an adhesive layer having a thickness of 1 μm, and a non-oriented polypropylene film (CPP) for lamination was laminated on the adhesive layer.

Two of the thus-prepared laminate films were placed one upon another with the surface of the CPP layer of one film facing that of the other, and subjected to a heat seal test at 180° C.

The test data are shown in Table 9.

Comparative Example 5

The same process as in Example 52 was repeated, except that a non-modified PVA having a degree of hydrolysis of 98.3 mol % and a degree of polymerization of 500 was used.

The test data are shown in Table 9.

Comparative Example 6

The same process as in Example 52 was repeated, except that an ethylene-vinyl alcohol copolymer (EVOH) having an ethylene unit content of 28 mol %, a degree of hydrolysis of 99.7 mol % and a degree of polymerization of 1000 was used, and that a mixed solvent of water/n-propyl alcohol (=5/5) was used as the solvent.

The test data are shown in Table 9.

TABLE 9

| | Data in Tests for Coating Agents (substrate: OPP) | | | | |
|---|---|---|---|---|---|
| | Coating Agent[1] (thickness: 3 μm) | Oxygen Transmission Rate (cc/m²·day·atm·20 μm·20° C.) | | Surface Smoothness (μm) | Heat Sealability at 180° C. |
| | | 65% RH | 85% RH | | |
| Example 52 | PVA (Et = 8 mol %) | 0.1 | 10 | 0 (with no streak) | good |

TABLE 9-continued

Data in Tests for Coating Agents (substrate: OPP)

| | Coating Agent[1] (thickness: 3 μm) | Oxygen Transmission Rate (cc/m²·day·atm·20 μm·20° C.) | | Surface Smoothness (μm) | Heat Sealability at 180° C. |
|---|---|---|---|---|---|
| | | 65% RH | 85% RH | | |
| Comp. Ex. 5 | Non-modified PVA (Et = 0 mol %) | 0.2 | 20 | 0 (with no streak) | good |
| Comp. Ex. 6 | EVOH (Et = 28 mol %) | 0.7 | 3 | 110 (with streaks) | deformed[2] |

[1]Drying condition: at a temperature of 100° C. and at a drying speed of 100 g/m²·min.
[2]Interlayer delamination found in the sealed laminate films.

The priority documents of the present application, Japanese patent application 154329/98 and 154330/98, both filed Jun. 3, 1998, are incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A laminate comprising:
   (A) a layer of a water-soluble polyvinyl alcohol comprising from 3 to 19 mol % of α-olefin units, wherein each said α-olefin unit contains up to 4 carbon atoms; and
   (B) a substrate layer of a polyolefin, a polyester or a polyamide,
   wherein the layer (A) has a surface smoothness of not more than 50 μm/cm.

2. The laminate as claimed in claim 1, wherein the water-soluble polyvinyl alcohol layer has a thickness of 0.1 to 9 μm.

3. The laminate as claimed in claim 1, wherein the water-soluble polyvinyl alcohol has a degree of hydrolysis of from 90 to 99.99 mol %.

4. The laminate as claimed in claim 1, wherein the water-soluble polyvinyl alcohol contains from 0.01 to 2% by weight of sodium acetate.

5. The laminate as claimed in claim 1, wherein the water-soluble polyvinyl alcohol contains at most 5 mol % of silyl group-containing units.

6. The laminate as claimed in claim 1, wherein the oxygen transmission rate is 0.1 to 15 cc/m²·day·atm, and the oxygen transmission rate is measured after the laminate has been conditioned at 20° C. and at 85%RH and obtained by converting the measured oxygen transmission rate value into the value for a water-soluble polyvinyl alcohol layer having a presumptive thickness of 20 μm.

7. The laminate as claimed in claim 1, wherein the substrate layer is oriented or heat treated before application of the water-soluble polyvinyl alcohol layer.

8. The laminate as claimed in claim 1, wherein the laminate is oriented or heat treated after application of the water-soluble polyvinyl alcohol layer.

9. The laminate as claimed in claim 1, wherein the polyvinyl alcohol has a degree of polymerization of 100–2000.

10. The laminate as claimed in claim 1, wherein the substrate layer contains 0.1–2.0 weight % of silicon.

11. The laminate as claimed in claim 10, wherein the silicon is in the form of a silica compound.

12. The laminate as claimed in claim 1, wherein the substrate layer has a thickness of 5 to 100 μm.

13. A method for producing the laminate of claim 1, comprising:
   applying an aqueous solution of a water-soluble polyvinyl alcohol to the surface of a film of a polyolefin, a polyester or a polyamide, wherein said polyvinyl alcohol contains from 3 to 19 mol % of α-olefin units, each said α-olefin unit contains up to 4 carbon atoms, and said solution contains at most 50% by weight of a lower aliphatic alcohol.

14. A method for producing the laminate of claim 1, comprising:
   applying an aqueous solution of a water-soluble polyvinyl alcohol to the surface of a film of a polyolefin, a polyester or a polyamide; and
   drying said film at a drying speed that falls between 2 and 2000 g/m² min;
   wherein said polyvinyl alcohol contains from 3 to 19 mol % of α-olefin units, and each of said α-olefin units contains up to 4 carbon atoms.

15. The laminate producing method as claimed in claim 14, wherein the drying speed falls between 50 and 500 g/m² min.

* * * * *